(12) United States Patent
Shikama et al.

(10) Patent No.: US 12,158,611 B2
(45) Date of Patent: Dec. 3, 2024

(54) OPTICAL FIBER GUIDE STRUCTURE AND OPTICAL FIBER CONNECTING STRUCTURE

(71) Applicant: Nippon Telegraph and Telephone Corporation, Tokyo (JP)

(72) Inventors: Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 340 days.

(21) Appl. No.: 17/620,487

(22) PCT Filed: Jun. 20, 2019

(86) PCT No.: PCT/JP2019/024487
§ 371 (c)(1),
(2) Date: Dec. 17, 2021

(87) PCT Pub. No.: WO2020/255329
PCT Pub. Date: Dec. 24, 2020

(65) Prior Publication Data
US 2022/0260786 A1 Aug. 18, 2022

(51) Int. Cl.
*G02B 6/30* (2006.01)
(52) U.S. Cl.
CPC ............ *G02B 6/30* (2013.01); *G02B 6/305* (2013.01)
(58) Field of Classification Search
None
See application file for complete search history.

(56) References Cited

U.S. PATENT DOCUMENTS

| | | | |
|---|---|---|---|
| 5,625,730 A * | 4/1997 | Ishikawa | G02B 6/3885 385/98 |
| 5,671,316 A * | 9/1997 | Yuhara | G02B 6/30 385/11 |
| 5,715,341 A | 2/1998 | Osugi et al. | |
| 11,366,304 B2 * | 6/2022 | Nakagawa | G02B 6/4243 |
| 2002/0034362 A1 * | 3/2002 | Yamazaki | G02B 6/30 385/80 |

(Continued)

FOREIGN PATENT DOCUMENTS

| | | |
|---|---|---|
| JP | H0293505 A | 4/1990 |
| JP | H04256908 A | 9/1992 |

(Continued)

*Primary Examiner* — Jerry Rahll
(74) *Attorney, Agent, or Firm* — Slater Matsil, LLP

(57) ABSTRACT

An optical fiber guide structure includes a guide member uprightly provided on a connection surface of an optical waveguide device and forming a space for housing a tip of an optical fiber when the optical fiber is connected to the optical waveguide device. The guide member is made of a photocurable resin. On the plane perpendicular to the direction in which the optical fiber is inserted into the space, the diameter of an inscribed circle within an inner wall of the guide member configured to form the space is substantially identical to the outer diameter of the optical fiber. The center of the inscribed circle coincides with the center of the core exposed from the connection surface of the optical waveguide device when viewed in the direction in which the optical fiber is inserted.

20 Claims, 12 Drawing Sheets

(56) References Cited

U.S. PATENT DOCUMENTS

| | | | | |
|---|---|---|---|---|
| 2003/0007741 A1* | 1/2003 | Ollier | .................. | G02B 6/3652 |
| | | | | 385/76 |
| 2011/0286701 A1* | 11/2011 | Mune | ...................... | G02B 6/30 |
| | | | | 385/74 |
| 2018/0364425 A1* | 12/2018 | Nanjo | .................. | G02B 6/3839 |

FOREIGN PATENT DOCUMENTS

| | | | | |
|---|---|---|---|---|
| JP | H0886934 | A | | 4/1996 |
| JP | H08201650 | A | | 8/1996 |
| JP | H10186163 | A | | 7/1998 |
| JP | H11133264 | A | | 5/1999 |
| JP | 2002357737 | A | | 12/2002 |
| JP | 2004078028 | A | | 3/2004 |
| JP | H04256908 | | * | 3/2004 |
| JP | 2005128244 | A | | 5/2005 |
| JP | 2016024439 | A | | 2/2016 |
| JP | 2019074708 | A | | 5/2019 |

\* cited by examiner

OPTICAL FIBER GUIDE STRUCTURE AND OPTICAL FIBER CONNECTING STRUCTURE

CROSS-REFERENCE TO RELATED APPLICATION

This application is a national phase entry of PCT Application No. PCT/JP2019/024487, filed on Jun. 20, 2019, which application is hereby incorporated herein by reference.

TECHNICAL FIELD

The present invention relates to optical fiber guide structures and optical fiber connection structures. In particular, the present invention relates to an optical fiber guide structure and an optical fiber connection structure that are used to connect optical fibers to an optical waveguide device.

BACKGROUND

In recent years, as data usage of traffic used by individuals for video services and traffic used by companies for the Internet of things (IoT), cloud services, and the like have increased, demands for greatly increased channel capacities inside or between data centers have grown. To achieve increased channel capacities, short distance communication systems using electrical signals have been replaced with optical interconnection technologies using, for example, optical transmission techniques employed for optical communication.

In typical optical interconnection systems, transmission for signal processing is achieved by using an optical transmission medium such as an optical waveguide or an optical fiber between a light-emitting element such as a laser diode (LD) and a light-receiving element such as a photodiode (PD) that are mounted on a printed board.

In accordance with the transmission method, the light-emitting element is integrated with a light modulation element and the like, or the light-emitting element is coupled in a discrete manner with the light modulation element and the like and also with a driver for electrical-to-optical conversion and the like. The configuration including the light-emitting element, the light modulation element, the driver, and the like is mounted as an optical transmitter on the printed board. Similarly, the light-receiving element is integrated with an optical processor and the like when appropriate, or the light-receiving element is coupled in a discrete manner with the optical processor and the like and also with an electrical amplifier circuit for optical-to-electrical conversion. The configuration including the light-receiving element, the optical processor, the electrical amplifier circuit, and the like is mounted as an optical receiver on the printed board.

An optical transceiver or the like formed by combining the optical transmitter and the optical receiver together is installed in a package or on a printed board and optically coupled with an optical transmission medium such as an optical fiber, such that optical interconnection is established. In accordance with the topology, optical interconnection may be established by additionally using, for example, a relay such as an optical switch.

Elements have been developed for practical use as the light-emitting element, the light-receiving element, and the light modulation element by using, for example, a semiconductor such as silicon or germanium, or a material of III-V semiconductors, notably indium phosphide (InP), gallium arsenide (GaAs), and indium gallium arsenide (InGaAs). In recent years, in addition to these kinds of elements, an optical waveguide transceiver comprising a silicon optical circuit or an indium phosphide optical circuit having a light transmission mechanism has been developed. In addition to the semiconductors, the light modulation element may be made of, for example, a ferroelectric such as lithium niobate, or a polymer.

Additionally, together with the light-emitting element, the light-receiving element, and the light modulation element, an optical functional element comprising a planar lightwave circuit made of quartz glass or the like may be provided. Examples of the optical functional element include a splitter, a wavelength multiplexer and demultiplexer, an optical switch, a polarization control element, and an optical filter. Hereinafter, a device formed by integrating the light-emitting element, the light-receiving element, the light modulation element, the optical functional element, the optical amplifier element, and the like with each other and having the light transmission and waveguide mechanism is referred to as an "optical waveguide device".

Usually, the optical waveguide device is connected to an optical fiber array attached to, for example, a glass having V-grooves. In this structure, it is desirable to connect the cores of the optical fibers to the cores of the waveguides of the optical waveguide device with low loss. This low-loss connection requires submicron accuracy for positioning (hereinafter referred to as "aligning") and fixing between the optical waveguide device and the optical fibers. In an optical waveguide device, aligning (optical alignment) is performed while light enters and exits the optical waveguide device so as to monitor the power, and as a result, the optical waveguide device is installed in a package or on a board in combination with an optical fiber array. However, since it is difficult to control optical fibers, there is a demand for easier aligning and fixing between an optical waveguide device and optical fibers.

Many methods of easy positioning and fixing between an optical waveguide device and optical fibers have been developed. A typical facilitation method is to change the optical alignment method described above to an aligning method using mechanical positioning.

As the aligning method using mechanical positioning, one method has been developed in which an optical fiber guide component having guide holes for receiving inserted optical fibers is in advance aligned with and fixed to an optical waveguide device by using, for example, optical alignment, and the optical fibers are then inserted into the guide holes of the optical fiber guide component on a board or in a package, such that the optical fibers are fixed to the optical waveguide device (refer to Patent Literature 1). An optical fiber guide component 80 described in Patent Literature 1 includes, as illustrated in FIGS. 14A and 14B, a V-groove substrate 801 having a plurality of V-grooves 801a, dummy optical fibers 60a disposed in two V-grooves at both ends of the V-grooves 801a, and a plate-like lid 802 joined to the V-groove substrate 801 by an adhesive layer (not illustrated in the drawings).

As illustrated in the plan view in FIG. 14A and the sectional view in FIG. 14B, the optical fiber guide component 80 is joined to an optical waveguide device 7 by an adhesive 82. The optical waveguide device 7 includes a waveguide substrate 71 and an optical waveguide layer 72 formed on the waveguide substrate 71. The optical waveguide layer 72 is composed of a cladding 722 formed on the waveguide substrate 71 and cores 721 formed in the cladding 722. Optical fibers 60 are fixed to a plug 61. Additionally, a connector receptacle, which is not illustrated in the drawings, is fixed to the optical fiber guide component 80. By inserting and fitting the plug 61 into the connector receptacle, the optical fibers 60 are inserted in guide holes 81a formed by the V-grooves 801a at the V-groove substrate 801 of the optical fiber guide component 80 and the lid 802, such that the optical fibers 60 are positioned at desired locations. Consequently, ends of the optical fibers 60 contact ends of the cores 721 of the optical waveguide device 7. As such, the optical fibers 60 and the cores 721 of the optical waveguide device 7 are optically connected to each other. To strengthen the joint between the optical waveguide device 7 and the optical fiber guide component 80, a reinforcement glass plate 86 is affixed to the optical waveguide device 7.

In the optical fiber guide component 80, the diameter of the guide holes 81 and 81a, which are formed by the V-grooves 801a and the lid 802, is determined in accordance with the diameter of the dummy optical fibers 60a disposed in the two V-grooves 801a at the both ends. To insert the optical fibers 60 in the guide holes, the guide holes are formed to have a diameter slightly larger than the diameter of the optical fibers 60. When a clearance is defined as the difference in diameter between the guide hole and the optical fiber 60, the clearance needs to be about a submicron clearance. As such, the diameter of the dummy optical fibers 60a is larger than the diameter of the optical fibers 60.

However, the method described above needs both the step of previously producing the optical fiber guide component 80 with high precision and the step of fixedly attaching the optical fiber guide component 80 on the optical waveguide device 7 by optical alignment with high precision, and thus, it cannot be said that the method accomplishes adequate facilitation of the process of forming an optical fiber guide structure. Moreover, by using, for example, the silicon photonics technology using silicon cores, optical waveguide devices have been significantly downsized in recent years in comparison to conventional optical waveguide devices. Conversely, optical fiber guide components are relatively large, and as a result, optical fiber guide components limit the downsizing of the overall size including the fiber connector.

CITATION LIST

Patent Literature

Patent Literature 1: Japanese Patent Laid-Open No. 2004-78028

SUMMARY

Technical Problem

The present invention has been made to solve the problem described above, and an object thereof is to provide an optical fiber guide structure and an optical fiber connection structure that enable easier formation and downsizing of the optical fiber guide structure and that achieve easy optical coupling between an optical waveguide device and optical fibers.

Means for Solving the Problem

To achieve the object described above, an optical fiber guide structure embodiment according to the present invention includes a guide member uprightly provided on a connection surface of an optical waveguide device and forming a space for housing a tip of an optical fiber when the optical fiber is connected to the optical waveguide device. The guide member is made of a photocurable resin. On the plane perpendicular to the direction in which the optical fiber is inserted into the space, the diameter of an inscribed circle within the inner wall of the guide member configured to form the space is substantially identical to the outer diameter of the optical fiber. The center of the inscribed circle coincides with the center of the core exposed from the connection surface of the optical waveguide device when viewed in the direction in which the optical fiber is inserted.

An optical fiber connection structure embodiment according to the present invention includes an optical waveguide device that includes an optical waveguide layer composed of a core and a cladding and that is formed as a plate, a reinforcement member provided in an area adjacent to a side edge surface of the optical waveguide device, an end surface of the core appearing at the side edge surface as one surface of the optical waveguide device, and an optical fiber guide structure uprightly provided on a connection surface constituted by the side edge surface of the optical waveguide device and the reinforcement member. The optical fiber guide structure includes a guide member uprightly provided on a connection surface of an optical waveguide device and forming a space for housing a tip of an optical fiber when the optical fiber is connected to the optical waveguide device. The guide member is made of a photocurable resin. On the plane perpendicular to the direction in which the optical fiber is inserted into the space, the diameter of an inscribed circle within the inner wall of the guide member configured to form the space is substantially identical to the outer diameter of the optical fiber. The center of the inscribed circle coincides with the center of the core exposed from the connection surface of the optical waveguide device when viewed in the direction in which the optical fiber is inserted.

Effects of Embodiments of the Invention

The embodiments of the present invention enable easier formation and downsizing of an optical fiber guide structure for connecting an optical waveguide device and optical fibers in direct contact with the end surface of an optical waveguide. By using the optical fiber guide structure as a guide, the embodiments of the present invention can implement an easy optical fiber connection structure for connecting the optical waveguide device and optical fibers.

DETAILED DESCRIPTION OF ILLUSTRATIVE EMBODIMENTS

Hereinafter, embodiments of the present invention will be described with reference to the drawings.

First Embodiment

An optical fiber guide structure and an optical fiber connection structure according to a first embodiment of the present invention will be described with reference to FIGS. 1A to 1F.

Configuration of Optical Fiber Connection Structure

Figure 1A:
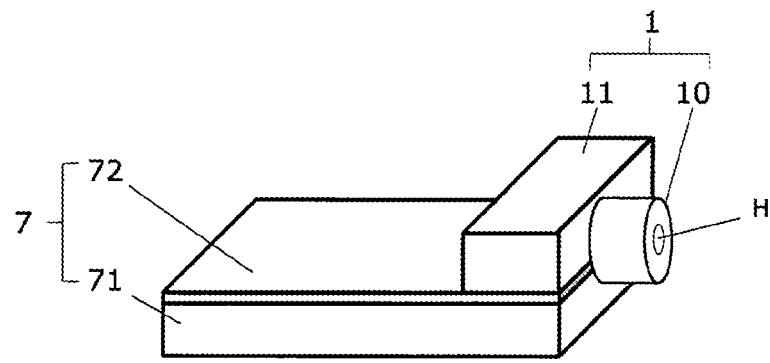
FIG. 1A is a perspective view schematically illustrating an optical fiber connection structure according to a first embodiment of the present invention.
Figure 1B:
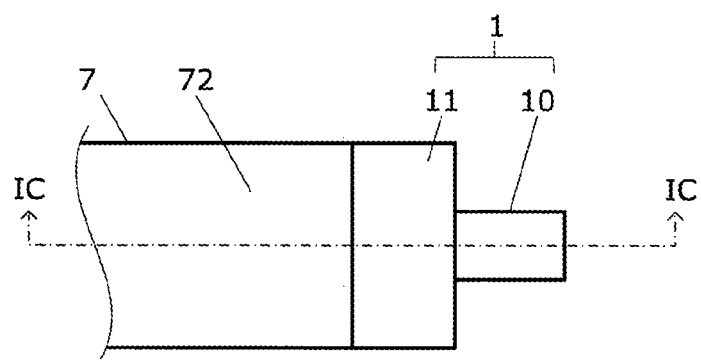
FIG. 1B is a top view schematically illustrating the optical fiber connection structure according to the first embodiment of the present invention.
Figure 1C:
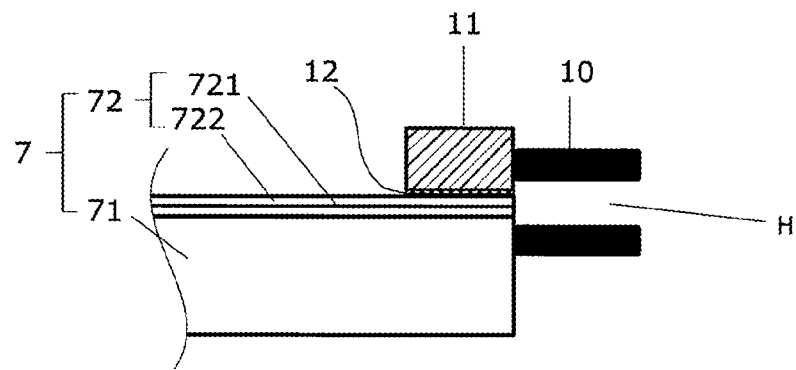
FIG. 1C is a sectional view illustrating a cross section taken along line IC-IC in FIG. 1B.

An optical fiber connection structure 1 according to the present embodiment includes, for example, an optical waveguide device 7, a reinforcement plate it, and a guide member 10 as illustrated in FIG. 1A. The optical waveguide device 7 is formed as a plate. The reinforcement plate 11 is provided at one surface of the optical waveguide device 7. The guide member 10 is uprightly provided on a connection surface constituted by a side edge surface of the optical waveguide device 7 and the reinforcement member.

Here, the optical waveguide device 7 includes an optical waveguide layer 72 comprising a core 721 formed of, for example, a silicon nanowire and a cladding 722. An end of the core 721 appears at the side edge surface of the optical waveguide device 7. This optical waveguide device 7 can be produced by using, for example, a silicon on insulator (SOI) substrate. More specifically, firstly, by employing technologies of photolithography, etching, and the like, a silicon surface layer of the SOI substrate is subjected to patterning, and as a result, a core layer serving as an optical waveguide (optical circuit) is formed. Next, by employing a deposition method such as the plasma-enhanced CVD method, silicon oxide is deposited to form an upper cladding layer. In this manner, it is possible to construct an optical waveguide in which a buried insulating layer serves as a lower cladding layer, and an upper cladding layer covers a core layer made of a silicon nanowire formed on the lower cladding layer. Here, the optical waveguide device 7 may also be, for example, a planar lightwave circuit made of a quartz glass thin film deposited on a silicon substrate. The optical waveguide device 7 is not limited to this example, and the optical waveguide device 7 can be any optical waveguide device having a waveguide mechanism. For example, as the substrate or the optical waveguide, in addition to quartz glass, the following materials can also be used: resins made of organic substances, semiconductors and compound semiconductor waveguides such as Si, silicon nitride (SiN), gallium arsenide, and indium phosphide (InP), and dielectric materials such as lithium niobate (LN) and periodically poled lithium niobate (PPLN).

Furthermore, various signal processing optical circuits for processing signals and various optical functional elements for light emission, light reception, modulation, control, or the like may be integrated into the optical waveguide device 7. Additionally, any optical functional devices such as an isolator, polarization rotation, a polarization splitter element, and an optical attenuator may be integrated into the optical waveguide device 7.

Usually, the optical waveguide device 7 comprises the waveguide substrate 71 and the optical waveguide layer 72 composed of the core 721 and the cladding 722. The optical waveguide layer 72 is as thin as about several micrometers to several tens of micrometers. When the optical waveguide device 7 is thin as described above, a reinforcement member is provided to strengthen the joint between the optical waveguide device 7 and the guide member 10. In the present embodiment, to form a part of the base on which the guide member 10 is uprightly provided, the reinforcement plate 11 serving as the reinforcement member is provided on one surface of the optical waveguide device 7 (in, for example, FIG. 1A, the upper surface of the optical waveguide device 7 formed as a plate) in an area adjacent to the side edge surface at which the end of the core 721 appears. The reinforcement plate 11 is fixed to the optical waveguide device 7 by using an adhesive 12 and the like.

This reinforcement plate 11 can be made by using a material such as glass, ceramic, or metal. To fix the reinforcement plate 11 to the optical waveguide device 7, in addition to adhesive bonding, metal bonding and the like can be used. One side surface of the reinforcement plate 11 forms one surface together with a connection surface of the optical waveguide device 7 to serve as a part of the connection surface on which the guide member 10 is disposed uprightly. To form one surface by the side edge surface of the optical waveguide device 7 and the side surface of the reinforcement plate 11, the reinforcement plate 11 may be fixed by using, for example, a mechanical jig; alternatively, when necessary, after the reinforcement plate 11 is fixed to the optical waveguide device 7, the reinforcement plate 11 may be cut with a dicing machine or polished.

The guide member 10, which is disposed uprightly on the connection surface formed by the side edge surface of the optical waveguide device 7 and the reinforcement member, forms a space for housing a tip of the optical fiber 60 as illustrated in FIGS. 1C to 1F. This guide member 10 forms an optical fiber guide structure for guiding the optical waveguide device 7 to be connected to the optical fibers 60.

Figure 1D:
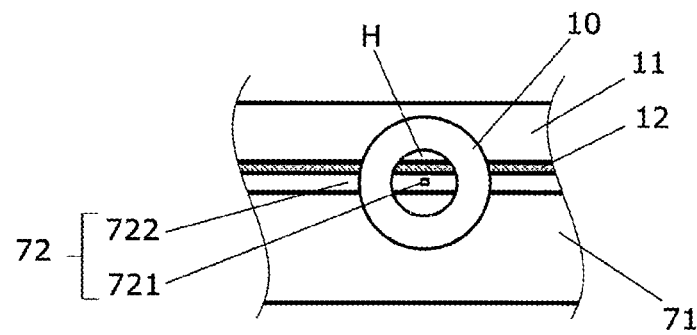
FIG. 1D is a front view schematically illustrating the optical fiber connection structure according to the first embodiment of the present invention.

In the present embodiment, the guide member 10 is formed in a cylindrical shape having a through-hole H. The through-hole H houses the tip of the optical fiber 60. As illustrated in FIG. 1D, the through-hole H is formed by the inner wall of the guide member 10, and the cross section plane of the through-hole H perpendicular to the axis of the through-hole H is a circular shape. The guide member 10 is joined to the connection surface formed by the side edge surface of the optical waveguide device 7 and the side surface of the reinforcement plate 11 in such a manner that the center of the through-hole H coincides with the core 721 appearing at the side edge surface of the optical waveguide device 7 when viewed from the front.

Figure 1E:
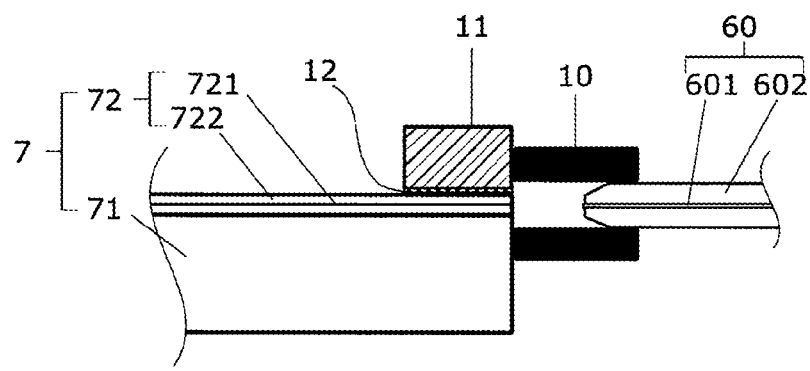
FIG. 1E is a sectional view schematically illustrating the optical fiber connection structure according to the first embodiment of the present invention.
Figure 1F:
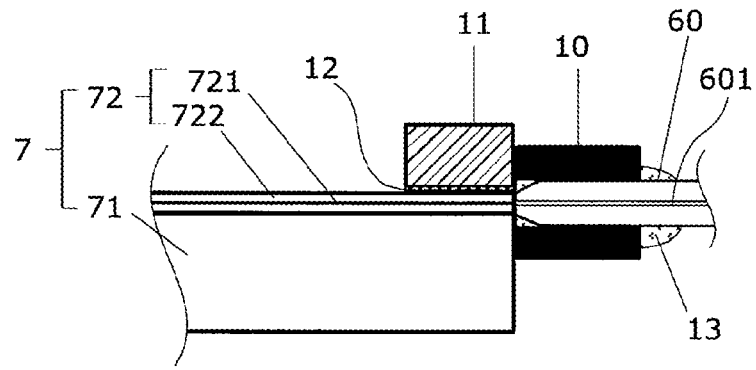
FIG. 1F is a sectional view schematically illustrating the optical fiber connection structure according to the first embodiment of the present invention.

FIG. 1E illustrates the state in which the optical fibers 60 are being inserted. FIG. 1F illustrates the state in which the optical fibers 60 are completely inserted. As illustrated in FIGS. 1E and 1F, the inner diameter of the guide member 10 is substantially identical to or slightly larger than the outer diameter of the optical fiber 60 to be inserted. By cutting off the edge of the end of the optical fiber 60 to be inserted as illustrated in FIG. 1E, it is possible to achieve easy insertion of the optical fiber 60 into the guide member 10.

As illustrated in FIG. 1F, a void portion formed by the optical waveguide device 7, the optical fiber 60, and the guide member 10 is filled with an adhesive 13. The optical fibers 60 positioned at a desired location by the guide member 10 are fixed to the optical waveguide device 7 by the guide member 10 and the adhesive 13. As a result, it is possible to connect the core 721 of the optical waveguide device 7 and a core 601 of the optical fiber 60 in line with each other with respect to the axis.

After the optical fiber 60 is completely inserted, as illustrated in FIG. 1F, the end surface of the optical fiber 60 may be fully in close contact with the connection surface of the optical waveguide device 7 without any air space to inhibit reflection; or the void portion between the side edge surface of the optical waveguide device 7 and the end of the optical fiber 60 may be filled with a refractive index matching material or an adhesive.

Figure 2:
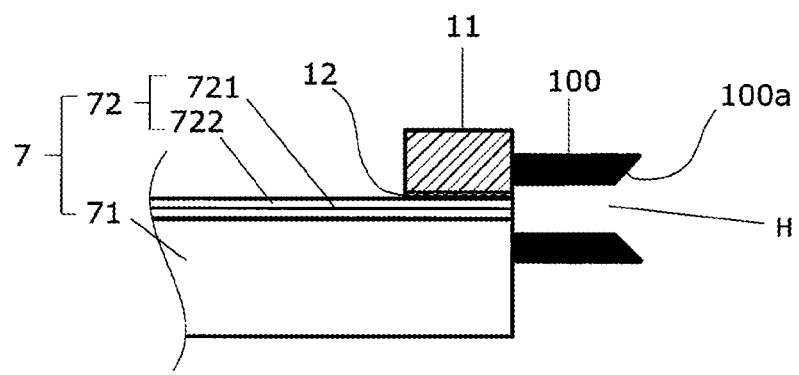
FIG. 2 is a sectional view schematically illustrating a modified example of the optical fiber connection structure according to the first embodiment of the present invention.

Additionally, as illustrated in FIG. 2, one end of a guide member 100 on the side opposite to the other end connected to the connection surface of the optical waveguide device 7, that is, one end having an opening for receiving the optical fiber 60 inserted is formed as a tapered structure bow in which the diameter of the circle formed by the inner wall of the guide member 100 increases toward the one end of the guide member 100, such that it is possible to achieve easier insertion of the optical fiber 60.

Next, a method of producing the guide member 10 will be described. As the first method, firstly, the reinforcement plate 11 is fixed to the upper surface of the optical waveguide device 7 by using an adhesive. A photoresist such as an ultraviolet (UV) curable resin or SU8 is applied to the connection surface of the optical waveguide device 7 and the side surface of the reinforcement plate 11 to form a photoresist film. Instead of applying a photoresist, the connection surface of the optical waveguide device 7 and the side surface of the reinforcement plate 11 may be dipped into a container filled with a photoresist to form a photoresist film.

Method of Forming Optical Fiber Connection Structure

Next, by using a certain optical system, UV light from a laser for waveguide formation is condensed and applied to the photoresist film. At this time, the position to be irradiated is scanned with the UV light, and consequently, a desired structure made of a photocurable resin is formed. Since the photoresist is optically hardened by being irradiated with UV light, when the position to be irradiated is scanned with UV light, the resin is hardened along the scanned path. In this manner, the guide member 10 is formed. The scanning with UV light is performed by using a light source and an optical system in cooperation with, for example, a motor, a piezo stage or the like, and a galvano mirror, a deflection element, or the like.

The second method is a stereolithography method using as a laser a femtosecond laser of a wavelength longer than a particular wavelength with which the photocurable resin becomes solid. In this method, at a position of a given light intensity caused by light condensation, two-photon absorption of the particular wavelength with which the photocurable resin becomes solid occurs due to the non-linear effect. The position of light condensation at which two-photon absorption occurs is scanned similarly to the first method described above, such that the guide member 10 is formed. This method enables nanoscale production using stereolithography with high precision. As described above, a pattern is formed by photocuring, the resin in a non-solidified area is then removed, and as a result, a three-dimensional structure is formed.

In an optical waveguide connection structure according to the present embodiment, to position the center of the through-hole H of the guide member 10 to coincide with the center of the core 721 appearing at the side edge surface of the optical waveguide device 7 when viewed from the front, for example, the core 721 appearing at the side edge surface of the targeted optical waveguide device 7 may be detected by using a high precision camera monitor when the object is formed, and the detected position may be used as a basis to form the guide member 10 by using a photocurable resin.

Figure 3:
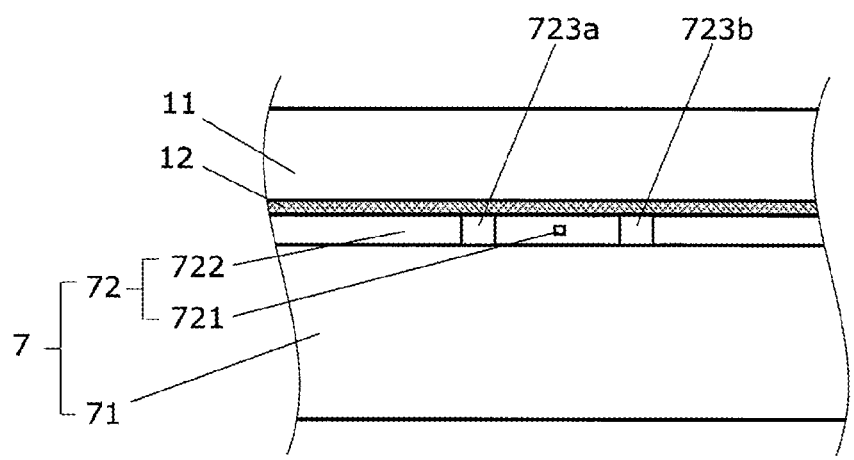
FIG. 3 is a front view illustrating an example of a connection surface of an optical waveguide device in the optical fiber connection structure according to the first embodiment of the present invention.
Figure 4:
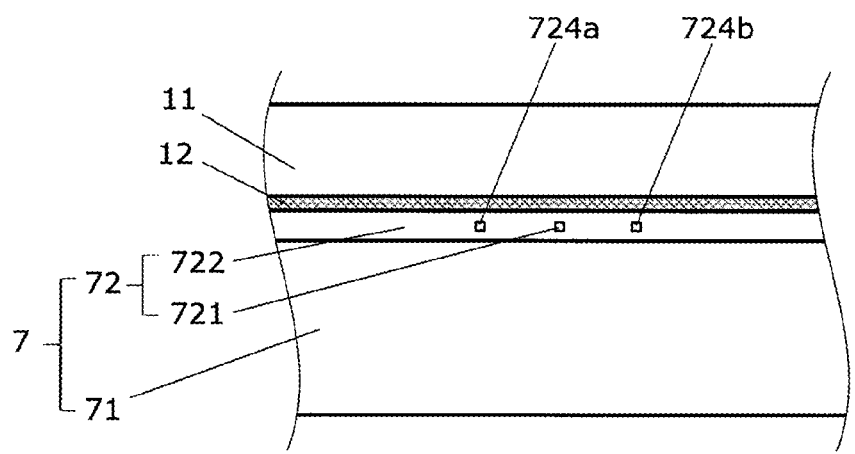
FIG. 4 is a front view illustrating another example of a connection surface of an optical waveguide device in the optical fiber connection structure according to the first embodiment of the present invention.

Alternatively, as illustrated in FIG. 3, dummy grooves 723a and 723b may be formed to penetrate the waveguide layer 72 of the optical waveguide device 7 to a connection surface of the optical waveguide device 7, and the grooves 723a and 723b are used as a basis when the photocurable resin is irradiated with UV light. Alternatively, as illustrated in FIG. 4, the optical waveguide device 7 further includes dummy cores 724a and 724b different from the core 721 to be connected to the optical fiber 60, and the dummy cores 724a and 724b are used as a basis to form the guide member 10.

Effect of Present Embodiment

As described above, with the optical fiber connection structure according to the present embodiment, it is possible to form a fiber guide structure with high precision of about submicron accuracy by directly drawing a pattern on the connection surface of an optical waveguide. Furthermore, it is unnecessary to perform optical alignment when optical fibers are attached.

Modified Example of Present Embodiment

It should be noted that, since in the present embodiment the guide member 10 made of a photocurable resin is directly formed on the connection surface of the optical waveguide device 7, the strength of the joint between the resin and the connection surface needs to be at a sufficient level. In this respect, the base of the guide member 10, that is, a portion of the outer periphery to be joined to the optical waveguide device 7 is made sufficiently large as appropriate to form a large joint area, and as a result, the strength of the joint can be increased.

Figure 5:
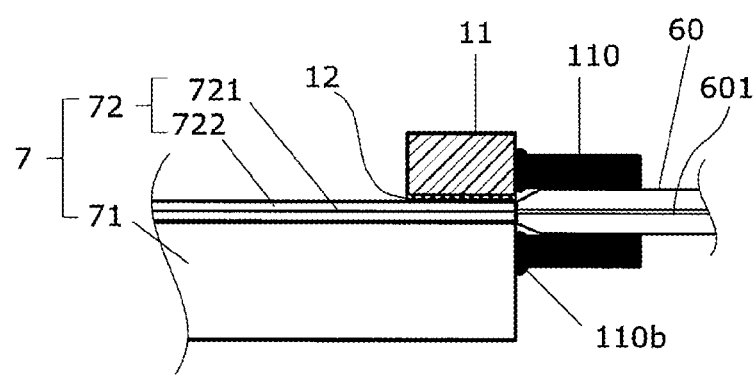
FIG. 5 is a sectional view schematically illustrating another modified example of the optical fiber connection structure according to the first embodiment of the present invention.

As illustrated in FIG. 5, at a guide member no, a bracket portion 110b is extended in the direction of the diameter close to both the base end inside a through-hole of the guide member no and the base end of the outer periphery, such that the strength of the joint can be further increased. In this case, the size of the bracket portion at the base end and the taper angle of the end of the optical fibers 60 are configured so as to avoid mechanical contact between the bracket portion inside the through-hole and the tip of the optical fiber 60 inserted in the through-hole.

Figure 6A:
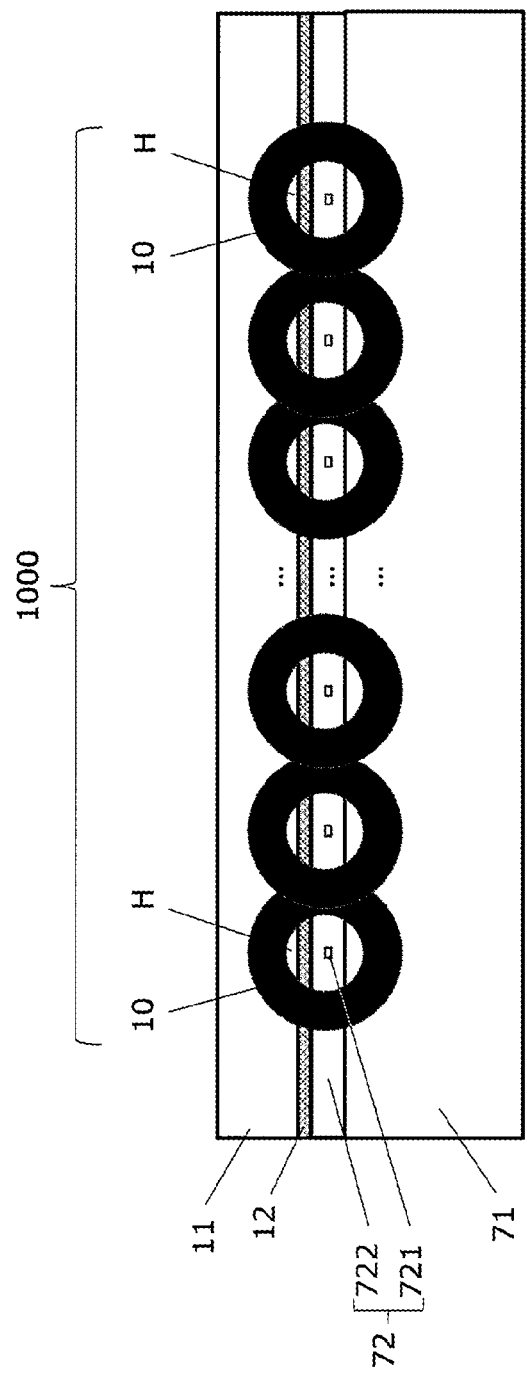
FIG. 6A is a front view schematically illustrating another modified example of the optical fiber connection structure according to the first embodiment of the present invention.

While FIGS. 1A to 1F describe the example in which a single optical fiber 60 is inserted in a single through-hole H formed in the guide member 10, embodiments of the present invention are not limited to this example in terms of the number of holes and the number of optical fibers. For example, as illustrated in FIG. 6A, when a plurality of cores 721 appearing at the connection surface of the optical waveguide device and a plurality of optical fibers are connected to each other, it is possible to form a guide member 1000 composed of a plurality of guide members 10 having the through-holes H in accordance with the number of the cores 721 connected. By inserting a plurality of optical fibers in the plurality of through-holes H of the guide member 1000, a plurality of optical fibers can be all connected to the optical waveguide device 7.

Figure 6B:
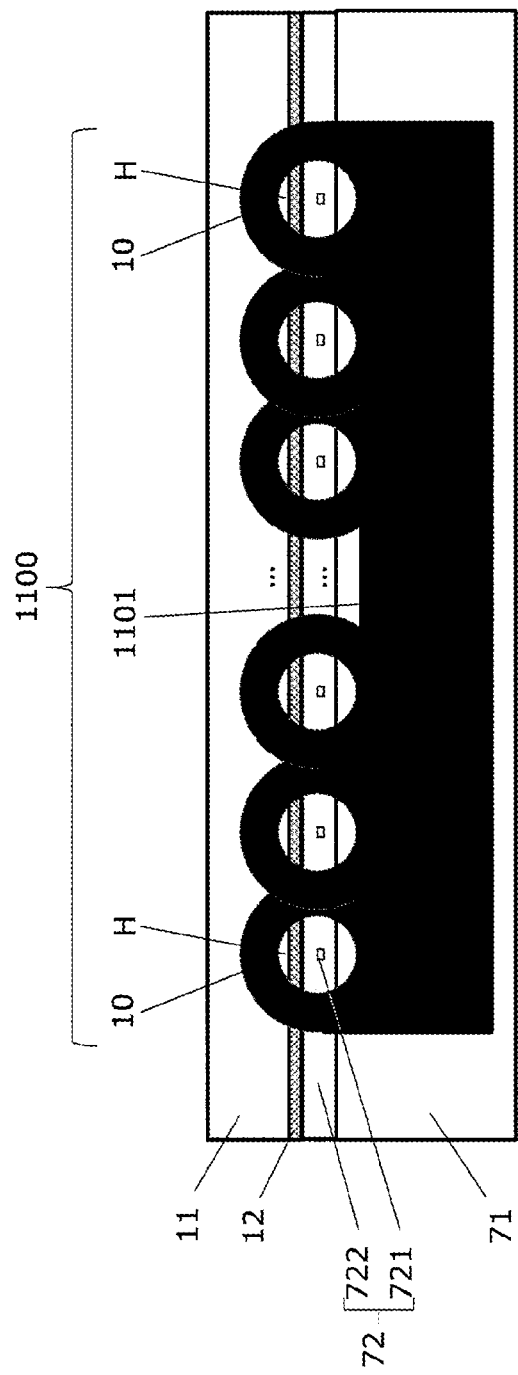
FIG. 6B is a front view schematically illustrating another modified example of the optical fiber connection structure according to the first embodiment of the present invention.

This kind of structure can be formed as the individual guide members 10 corresponding to the respective cores 721 as illustrated in FIG. 6A or formed as a single structure 1100 including an attachment portion 1101 attached to a plurality of guide members 10 and also including a plurality of through-holes H as illustrated in FIG. 6B. In particular, with the mode illustrated in FIG. 6B, since the attachment portion 1101 is provided in addition to the guide members 10, the joint area with the optical waveguide device 7 can be enlarged, and as a result, it is possible to increase the mechanical strength between the structure 1100 and the optical waveguide device 7.

Figure 7:
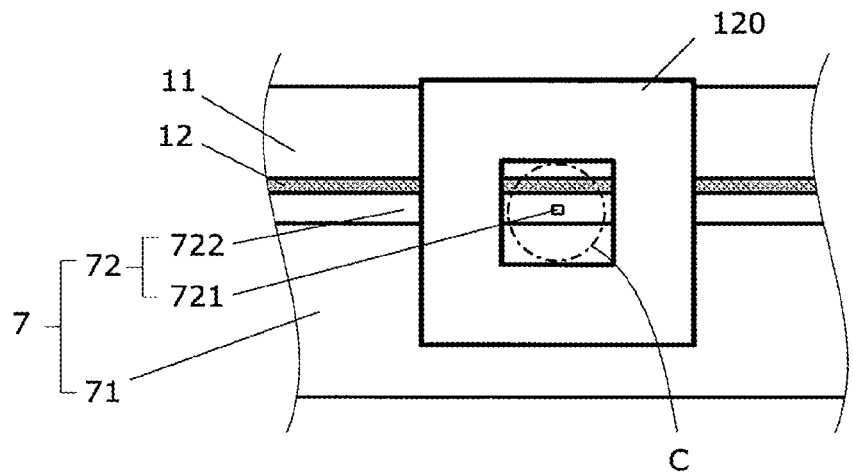
FIG. 7 is a front view schematically illustrating another modified example of the optical fiber connection structure according to the first embodiment of the present invention.
Figure 8:
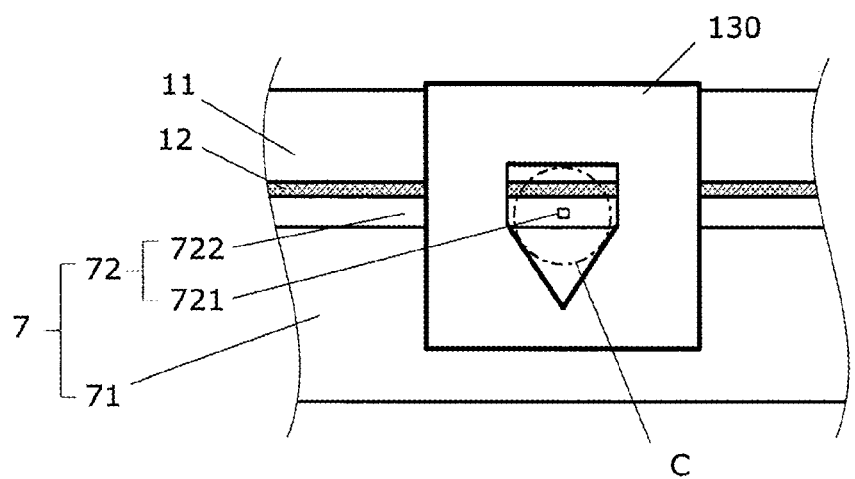
FIG. 8 is a front view schematically illustrating another modified example of the optical fiber connection structure according to the first embodiment of the present invention.

While the cross section plane perpendicular to the axis of the through-hole H is a circular shape in the examples in FIGS. 1A to 1F, 2, 5, 6A, and 6B, the cross section plane perpendicular to the axis is not necessarily a circular shape when the structure of the guide member enables insertion and positioning of the optical fiber 60. For example, the guide member may be formed to have a cross section plane perpendicular to the axis of the through-hole H shaped into a polygon, such as a triangle or quadrangle, an oval, or a modification to these shapes. FIG. 7 illustrates an example of a quadrangular cross section plane perpendicular to the axis of a through-hole. FIG. 8 illustrates an example of a pentagonal cross section plane perpendicular to the axis of a through-hole. In either case, the same effect can be achieved by making the diameter of a circle C inscribed in the inner wall of a guide member 120 or the inner wall of a guide member 130 substantially identical to or slightly larger than the outer diameter of the optical fiber 60 to be inserted.

While in the examples described above the outer peripheral structure of the guide member is formed in a cylindrical shape and the cross section plane perpendicular to the axis of the guide member is a circle, the structure can be designed as any shape. For example, as illustrated in FIGS. 7 and 8, the cross section plane may be shaped into a polygon, such as a quadrangle, an oval, or a modification to these shapes.

Second Embodiment

Next, an optical fiber guide structure and an optical fiber connection structure according to a second embodiment of the present invention will be described with reference to FIGS. 9A and 9B. It should be noted that constituent elements identical to the constituent elements of the optical fiber connection structure according to the first embodiment are designated by the same reference characters, and detailed descriptions thereof are omitted.

In the optical fiber connection structure according to the present embodiment, similarly to the optical fiber connection structure according to the first embodiment described above, a guide member 140 made of a photocurable resin is provided at the connection surface formed by the side edge surface of the optical waveguide device 7 and the side surface of the reinforcement plate 11. The guide member 140 made as the optical fiber guide structure is shaped into a tube and has the through-hole H.

Figure 9A:
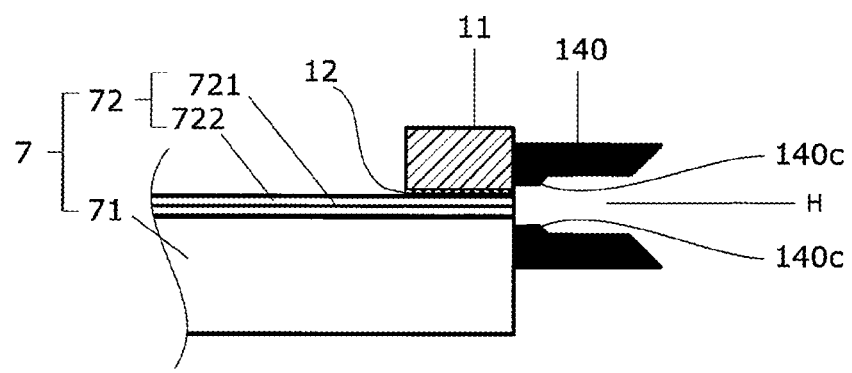
FIG. 9A is a sectional view schematically illustrating an optical fiber connection structure according to a second embodiment of the present invention.
Figure 9B:
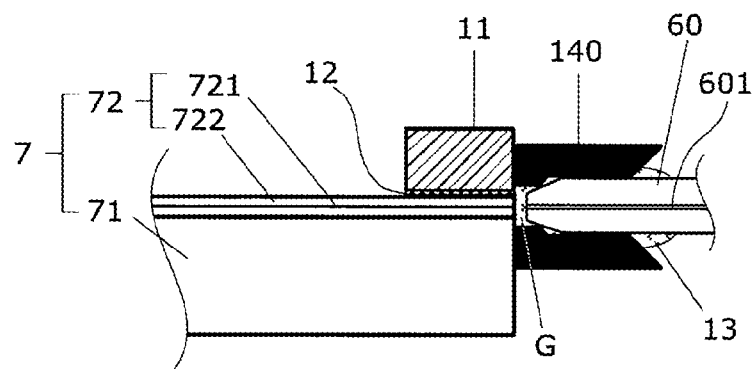
FIG. 9B is a sectional view schematically illustrating the optical fiber connection structure according to the second embodiment of the present invention.

As illustrated in FIG. 9A, the guide member 140 includes a stopper structure 140c that is provided at one end of the guide member 140 on the side connected to the connection surface of the optical waveguide device 7 and that abuts the optical fiber 60 when the optical fiber 60 is inserted. The stopper structure 140c is extended at one end of the inner wall of the through-hole H on the side connected to the optical waveguide device 7 in the direction of the diameter of the through-hole H, that is, toward the axis at the center of the through-hole H. Due to the stopper structure 140c, the diameter of the circle inscribed within the inner wall of the through-hole H is smaller than the outer diameter of the inserted optical fiber 60. As a result, the stopper structure 140c of the guide member 140 contacts the tip of the optical fiber 60 when the optical fiber 60 is inserted in the guide member 140; or when the tip of the optical fiber 60 is tapered by cutting off the edge as illustrated in FIG. 9B, the stopper structure 140c contacts the outer surface of the tapered portion.

In the optical fiber connection structure according to the present embodiment, by forming the stopper structure 140c to contact the tip of the optical fiber 60 inside the through-hole H, a certain gap G is provided between the optical waveguide device 7 and the end of the optical fiber 60. Additionally, by filling the gap G with the adhesive 13, the optical fibers 60 can be fixedly attached to the optical waveguide device 7 while the certain gap G is maintained.

With the optical fiber connection structure according to the present embodiment, an adhesive layer of a given thickness can be provided between the end of the waveguide of the optical waveguide device 7 and the end of the optical fiber 60. Consequently, in addition to achieving the same effect as the effect achieved by the optical fiber connection structure according to the first embodiment, the optical fiber connection structure according to the present embodiment can achieve more reliable connection by avoiding partial detachment due to the insufficient thickness of the adhesive layer.

Third Embodiment

Figure 10A:
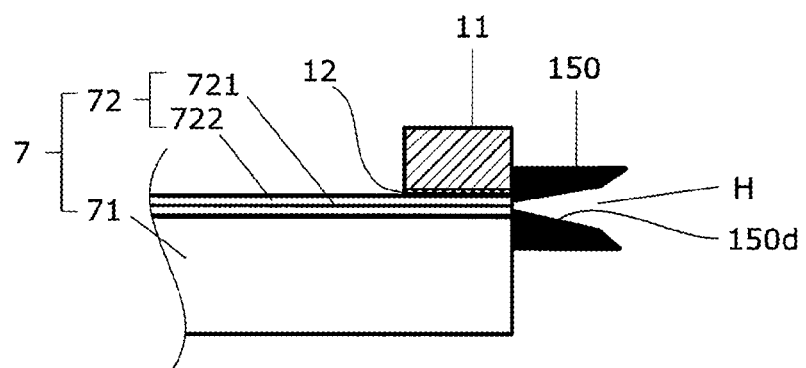
FIG. 10A is a sectional view schematically illustrating an optical fiber connection structure according to a third embodiment of the present invention.
Figure 10B:
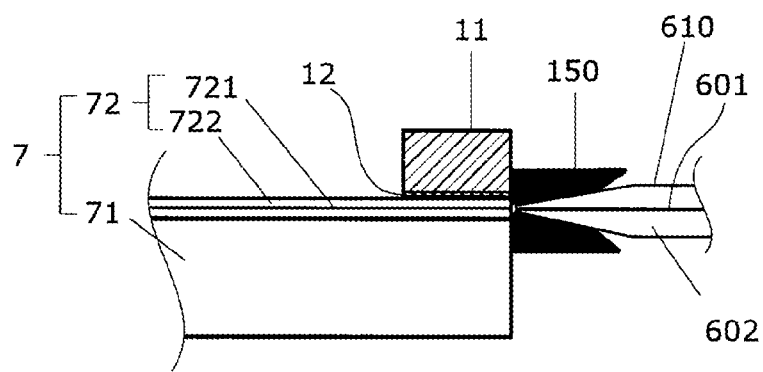
FIG. 10B is a sectional view schematically illustrating the optical fiber connection structure according to the third embodiment of the present invention.

Next, an optical fiber guide structure and an optical fiber connection structure according to a third embodiment of the present invention will be described with reference to FIGS. 10A and 10B.

In the optical fiber connection structure according to the present embodiment, similarly to the guide member 10 according to the first embodiment, a guide member 150 formed as the optical fiber guide structure is shaped into a tube. However, the guide member 150 has a tapered structure in which the diameter of the inscribed circle within the inner wall of the guide member 150 decreases from an opening for receiving the optical fiber 60 inserted toward the connection surface of the optical waveguide device 7; in other words, the diameter of the inscribed circle increases from one end to be connected to the connection surface of the optical waveguide device 7 toward the opposite end. This complex structure can also be made by employing stereolithography.

In the present embodiment, the tip of an optical fiber 610 to be inserted into the guide member 150 is also thinned toward the end of the tip so that the tip of the optical fiber 610 fits the tapered inner wall of the guide member 150 when the optical fiber 610 is housed in the through-hole of the guide member 150.

In the optical fiber connection structure according to the first embodiment and the optical fiber connection structure according to the second embodiment, in order to insert the optical fiber 60 in the through-hole H of the circular cross section plane, a clearance is provided by making the diameter of the through-hole H slightly larger than the contour of the optical fiber 60. In contrast, the optical fiber connection structure according to the present embodiment can eliminate the need for a clearance by forming the through-hole H and the optical fiber 60 in a tapered manner with a taper angle common to the through-hole H and the optical fiber 60.

As a result, in addition to the same effect as the effect achieved by the optical fiber connection structure according to the first embodiment described above, the optical fiber connection structure according to the present embodiment can also achieve a new effect of avoiding small misalignment between the core of the fiber and the core of the waveguide due to the clearance and consequently achieve optical coupling with high precision, that is, low loss.

Fourth Embodiment

Figure 11A:
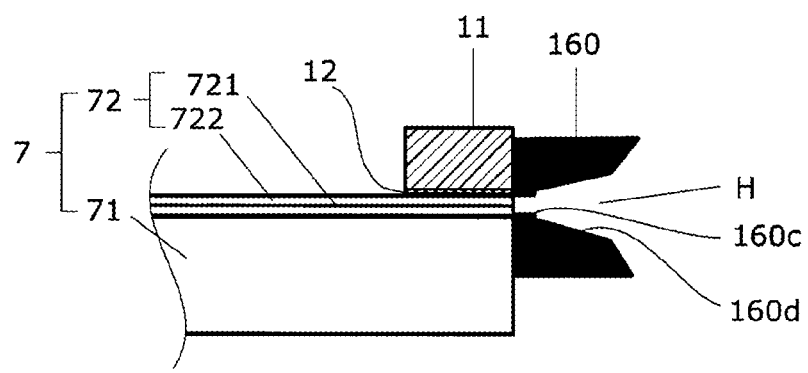
FIG. 11A is a sectional view schematically illustrating an optical fiber connection structure according to a fourth embodiment of the present invention.

Next, an optical fiber guide structure and an optical fiber connection structure according to a fourth embodiment of the present invention will be described with reference to FIGS. 11A and 11B. The optical fiber connection structure according to the present embodiment has, similarly to the optical fiber connection structure according to the third embodiment described above, a tapered structure in which the diameter of the inscribed circle within the inner wall of a guide member 160 formed as a tube gradually decreases from an opening for receiving the inserted optical fiber 60 to the connection surface of the optical waveguide device 7; and additionally, the optical fiber connection structure according to the present embodiment includes a stopper layer 160c at a position close to the connection surface of the optical waveguide device 7. This complex structure can also be easily made by employing stereolithography.

Figure 11B:
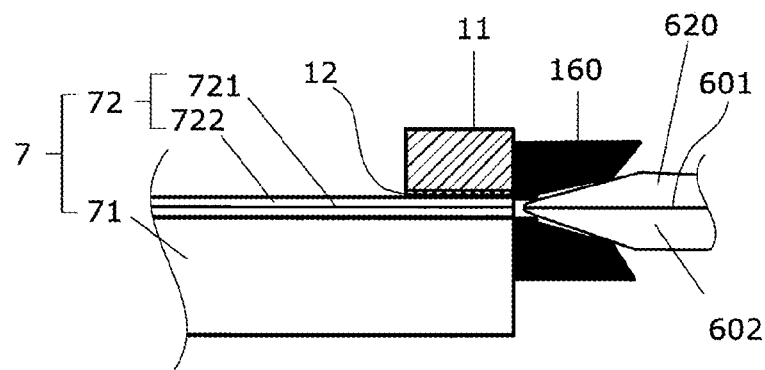
FIG. 11B is a sectional view schematically illustrating the optical fiber connection structure according to the fourth embodiment of the present invention.

As illustrated in FIG. 11B, the tip of an optical fiber 620 to be inserted into the guide member 160 is thinned toward the end of the tip. Additionally, the core 601 of the optical fiber 620 is also tapered to have the end surface shaped into a lens so that the optical fiber 620 functions as a lensed fiber. Thus, the taper angle of the inner diameter of the guide member 160 is identical to the taper angle of the end of the optical fiber 620, and the smallest inner diameter of the guide member 160 is very small so that the guide member 160 fits the tip of the optical fiber 620.

As a result, in addition to achieving the same effects as the effects achieved by the optical fiber connection structure according to the first embodiment and the optical fiber connection structure according to the second embodiment described above, the optical fiber connection structure according to the present embodiment can eliminate the need for a clearance between the guide member 160 and the optical fiber 620 by making the taper angle of the through-hole H of the guide member 160 and the taper angle of the optical fiber 620 identical to each other. As a result, it is possible to avoid slight misalignment between the core of the fiber and the core of the waveguide due to the clearance, which results in a new effect of achieving optical coupling with high precision, that is, low loss.

To minimize the loss of optical coupling when the optical fiber 620 functions as a lensed fiber and the end surface of the core 601 functions as a lens, a certain space between the end of the optical fiber 620 and the connection surface of the optical waveguide device 7 is desired. Since the present embodiment includes the stopper structure formed as the stopper layer 160c, the end of the optical fiber 620 formed to function as a lens is positioned at the location facing the connection surface of the optical waveguide device 7 with an air space formed between the end of the optical fiber 620 and the connection surface of the optical waveguide device 7, such that the end of the optical fiber 620 is supported while an optimum space is left between the end of the optical fiber 620 and the connection surface of the optical waveguide device 7. As a result, it is possible to achieve a new effect of minimizing the coupling loss of the optical fiber 620 serving as a lensed fiber and the core 721 of the optical waveguide device 7.

Figure 12:
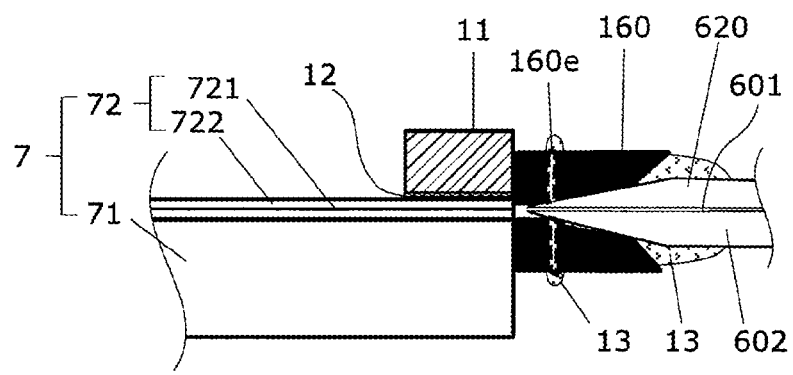
FIG. 12 is a sectional view schematically illustrating a modified example of the optical fiber connection structure according to the fourth embodiment of the present invention.
Figure 13:
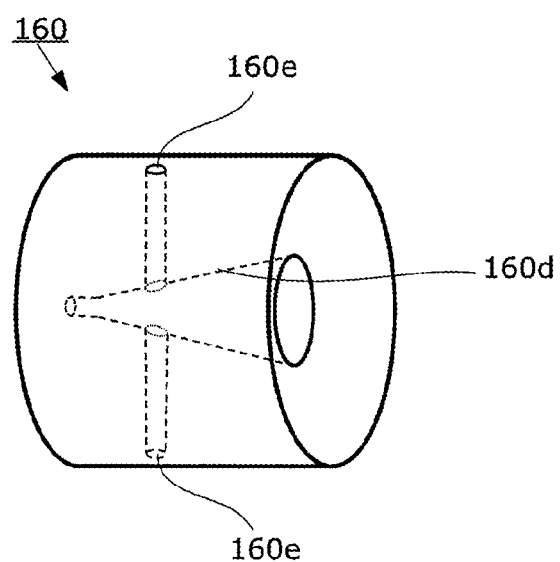
FIG. 13 is a perspective view schematically illustrating an optical fiber guide structure according to the fourth embodiment of the present invention.
Figure 14A:
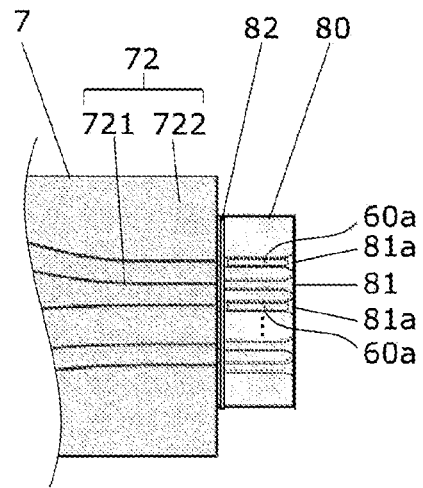
FIG. 14A is a top view schematically illustrating an example of optical fiber connection structures.
Figure 14B:
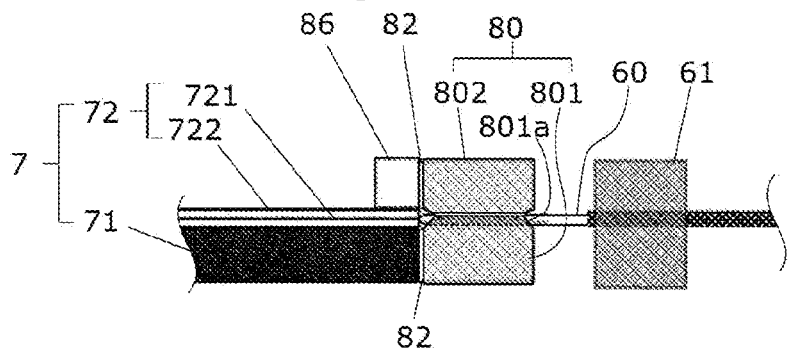
FIG. 14B is a side view schematically illustrating the example of optical fiber connection structures.

Further, as illustrated in FIG. 12, the optical fiber 620 may be fixed by filling a void portion between the guide member 160 and the optical fiber 620 with the adhesive 13. At this time, a void portion may be formed between the optical fiber 620 serving as a lensed fiber and the connection surface of the optical waveguide device 7, and the void portion may be filled with air or an adhesive. Particularly, to improve the refractive power of the lens of the lensed fiber, the void portion can be formed as an air space. In this case, as illustrated in FIG. 13, a discharge hole 160e for adhesive can be formed at a part of the guide member 160, so that the void portion can be formed as an air space because the adhesive does not spread between the end of the optical fiber 620 and the connection surface of the optical waveguide device 7.

INDUSTRIAL APPLICABILITY

The embodiments of the present invention can be applied to technologies for connecting optical fibers to an optical waveguide device.

REFERENCE SIGNS LIST

1 Optical fiber connection structure
10, 100, 110, 120, 130, 140, 150, 160 Guide member 11 Reinforcement plate
60, 610, 620 Optical fiber
601 Core
7 Optical waveguide device
72 Optical waveguide layer
721 Core
H Through-hole
G Gap

The invention claimed is:

1. An optical fiber guide structure comprising:
a guide member comprising a photocurable resin, the guide member being uprightly disposed on a connection surface of an optical waveguide device and fixed to the connection surface of the optical waveguide device by direct contact between the photocurable resin and the connection surface of the optical waveguide device, the guide member comprising an inner wall defining a space for housing a tip of an optical fiber in a state in which the optical fiber is connected to the optical waveguide device,
wherein on a plane perpendicular to a direction in which the optical fiber is inserted into the space, a diameter of an inscribed circle within the inner wall of the guide member is substantially identical to an outer diameter of the optical fiber, and
wherein a center of the inscribed circle coincides with a center of a core appearing at the connection surface of the optical waveguide device when viewed in the direction in which the optical fiber is inserted.

2. The optical fiber guide structure of claim 1, wherein the guide member comprises a first tapered structure in which, in a state in which a first end of the guide member is connected to the connection surface of the optical waveguide device, the diameter of the inscribed circle increases toward a second end opposite to the first end.

3. The optical fiber guide structure of claim 1, wherein the guide member comprises a stopper structure in which, in a state in which a first end of the guide member is connected to the connection surface of the optical waveguide device, the diameter of the inscribed circle at the first end is smaller than the outer diameter of the optical fiber.

4. The optical fiber guide structure of claim 1, wherein the guide member comprises a second tapered structure in which, in a state in which a first end of the guide member is connected to the connection surface of the optical waveguide device, the diameter of the inscribed circle increases toward a second end opposite to the first end, and wherein the tip of the optical fiber is thinned toward a tip end of the tip, the tip of the optical fiber fitting the inner wall of the guide member including the second tapered structure in a state in which the tip of the optical fiber is housed in the space.

5. The optical fiber guide structure of claim 4, wherein the guide member comprises a stopper structure at the first end, the stopper structure is connected to the connection surface of the optical waveguide device, and the stopper structure is thinned toward the tip end.

6. The optical fiber guide structure of claim 1 further comprising:
an adhesive in a void portion between the guide member and the optical waveguide device or between the guide member and the optical fiber.

7. The optical fiber guide structure of claim 1 further comprising:
an adhesive in a void portion between the guide member and a side surface of the optical fiber,
wherein the optical fiber comprises a lens at a tip end surface of the optical fiber, and
wherein the lens is positioned at a location facing the connection surface of the optical waveguide device, and an air space is disposed between the lens and the connection surface of the optical waveguide device.

8. An optical fiber connection structure comprising:
an optical waveguide device comprising an optical waveguide layer, the optical waveguide layer comprising a core and a cladding;
a reinforcement member in an area adjacent to a side edge surface of the optical waveguide device, an end surface of the core appearing at the side edge surface as one surface of the optical waveguide device; and
an optical fiber guide structure comprising a photocurable resin, the optical fiber guide structure being uprightly disposed on a connection surface and fixed to the connection surface by direct contact between the photocurable resin and the connection surface, the connection surface being defined by the side edge surface of the optical waveguide device and the reinforcement member, the optical fiber guide structure comprising an inner wall defining a space for housing a tip of an optical fiber in a state in which the optical fiber is connected to the optical waveguide device,
wherein on a plane perpendicular to a direction in which the optical fiber is inserted into the space, a diameter of an inscribed circle within the inner wall of the optical fiber guide structure is substantially identical to an outer diameter of the optical fiber, and
wherein a center of the inscribed circle coincides with a center of the core appearing at the connection surface when viewed in the direction in which the optical fiber is inserted.

9. The optical fiber connection structure of claim 8, wherein the optical fiber guide structure comprises a first tapered structure in which, in a state in which a first end of the optical fiber guide structure is connected to the connection surface of the optical waveguide device, the diameter of the inscribed circle increases toward a second end opposite to the first end.

10. The optical fiber connection structure of claim 8, wherein the optical fiber guide structure comprises a stopper structure in which, in a state in which a first end of the optical fiber guide structure is connected to the connection surface of the optical waveguide device, the diameter of the inscribed circle at the first end is smaller than the outer diameter of the optical fiber.

11. The optical fiber connection structure of claim 8, wherein the optical fiber guide structure comprises a second tapered structure in which, in a state in which a first end of the optical fiber guide structure is connected to the connection surface of the optical waveguide device, the diameter of the inscribed circle increases toward a second end opposite to the first end, and wherein the tip of the optical fiber is thinned toward a tip end of the tip, the tip of the optical fiber fitting the inner wall of the optical fiber guide structure including the second tapered structure in a state in which the tip of the optical fiber is housed in the space.

12. The optical fiber connection structure of claim 11, wherein the optical fiber guide structure comprises a stopper structure at the first end, the stopper structure is connected to the connection surface of the optical waveguide device, and the stopper structure is thinned toward the tip end.

13. The optical fiber connection structure of claim 8, wherein the optical fiber guide structure further comprises:

an adhesive in a void portion between the optical fiber guide structure and the optical waveguide device or between the optical fiber guide structure and the optical fiber.

14. The optical fiber connection structure of claim 8, wherein the optical fiber guide structure further comprises:
an adhesive in a void portion between the optical fiber guide structure and a side surface of the optical fiber,
wherein the optical fiber comprises a lens at a tip end surface of the optical fiber, and
wherein the lens is positioned at a location facing the connection surface of the optical waveguide device, and an air space is disposed between the lens and the connection surface of the optical waveguide device.

15. A method comprising:
applying a photocurable resin on a connection surface of an optical waveguide device;
forming a guide member on the connection surface of the optical waveguide device by selectively irradiating portions of the photocurable resin on the connection surface to form the guide member surrounding a center point of a core of the optical waveguide device, wherein an inner wall of the guide member defines a space; and
connecting an optical fiber to the optical waveguide device by inserting the optical fiber into the space in a direction, wherein on a plane perpendicular to the direction, a diameter of an inscribed circle within the inner wall of the guide member is substantially identical to an outer diameter of the optical fiber, and wherein a center of the inscribed circle coincides with the center of the core appearing at the connection surface of the optical waveguide device when viewed in the direction.

16. The method of claim 15, wherein the guide member comprises a first tapered structure in which, in a state in which a first end of the guide member is connected to the connection surface of the optical waveguide device, the diameter of the inscribed circle increases toward a second end opposite to the first end.

17. The method of claim 15, wherein the guide member comprises a stopper structure in which, in a state in which a first end of the guide member is connected to the connection surface of the optical waveguide device, the diameter of the inscribed circle at the first end is smaller than the outer diameter of the optical fiber.

18. The method of claim 15, wherein the guide member comprises a second tapered structure in which, in a state in which a first end of the guide member is connected to the connection surface of the optical waveguide device, the diameter of the inscribed circle increases toward a second end opposite to the first end, and wherein a tip of the optical fiber is thinned toward a tip end of the tip, the tip of the optical fiber fitting the inner wall of the guide member including the second tapered structure in a state in which the tip of the optical fiber is housed in the space.

19. The method of claim 18, wherein the guide member comprises a stopper structure at the first end, the stopper structure is connected to the connection surface of the optical waveguide device, and the stopper structure is thinned toward the tip end.

20. The method of claim 15 further comprising:
dispensing an adhesive in a void portion between the guide member and the optical waveguide device or between the guide member and the optical fiber.

* * * * *